Feb. 18, 1930.   A. DUFAUX   1,747,932
VEHICLE SEAT
Filed Nov. 28, 1927   3 Sheets-Sheet 1

Feb. 18, 1930.  A. DUFAUX  1,747,932
VEHICLE SEAT
Filed Nov. 28, 1927   3 Sheets-Sheet 2

Feb. 18, 1930.  A. DUFAUX  1,747,932
VEHICLE SEAT
Filed Nov. 28, 1927   3 Sheets-Sheet 3
Fig. 3
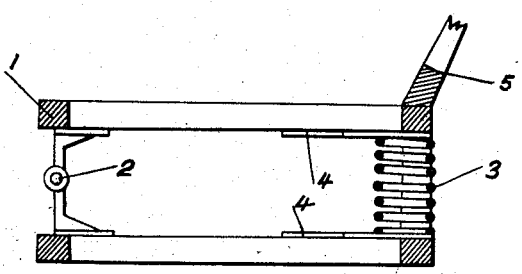
Fig. 6
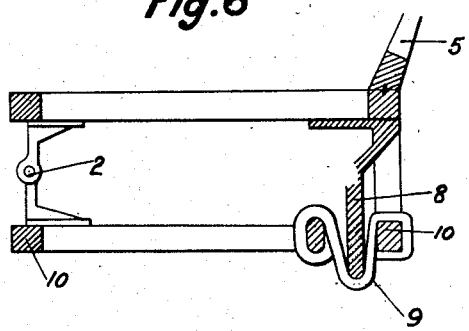
Fig. 9
Fig. 10
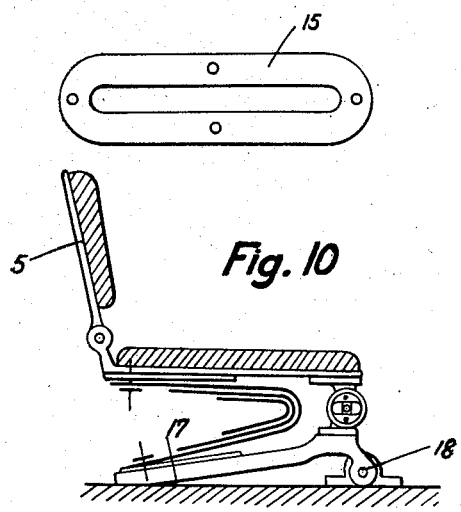
Witnesses
Inventor:
Armand Dufaux
per Fred F. Hadow
Attorney Patented Feb. 18, 1930

1,747,932

UNITED STATES PATENT OFFICE

ARMAND DUFAUX, OF PARIS, FRANCE

VEHICLE SEAT

Application filed November 28, 1927, Serial No. 236,302, and in France December 27, 1926.

My invention relates to improvements in vehicle seats and more particularly to a seat which is specifically adapted to give comfort to the driver of the vehicle.

The invention resides in certain novel forms, construction and combination of parts, the objects of which will be obvious to those skilled in the art from the following description taken in connection with the accompanying drawing forming a part of this specification and in which—

Figs. 3, 4, 5 and 6 are respectively four different embodiments of the invention in side elevation and partly in section based upon the principles illustrated in Fig. 2;

Fig. 9 is a detail of a spring guide; and

Fig. 10 is a partial transverse section of another form of seat.

Figure 1:
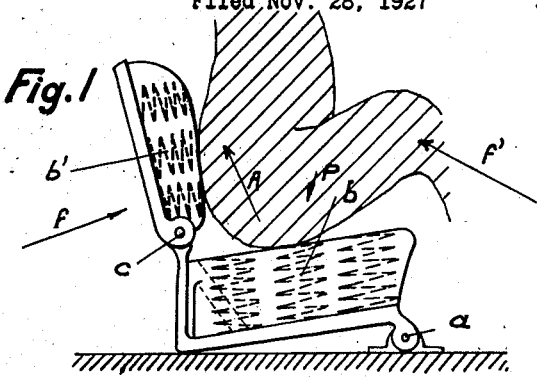
Fig. 1 is a view in side elevation of the seats now in use illustrating the disadvantages thereof diagrammatically.

The automobile seats now in use have very grave disadvantages. As shown in Fig. 1, the seat and its back are usually furnished with spring cushions. The iron braces thereof are generally mounted at their front on a hinge $a$ permitting the seat to be turned over toward the front for allowing the occupants of the vehicle to pass. Likewise the back is mounted on hinges $c$ in order to also be turned over on the seat. The disadvantages of such a seat may be summarized as follows:

1st. The springs $b$ of the seat cushion loaded with the weight of the occupant P take an oscillatory movement under the influence of the shocks imparted to the vehicle which movements are very annoying to the occupant P in view of the fact that his back continually rubs upon the seat-back.

2nd. The shocks instigated by the bad condition of the road and transmitted to the chassis by the axle-trees not only provoke a vertical displacement of the occupant but also a rotary movement, whose pivot point is, sometimes the front axle-tree and other times the rear-end of the vehicle. The forces produced thereby are represented by the arrows $f$ and $f'$ tending to project the occupant P from the front to the rear or vice versa through the medium of the springs $b'$ of the seat-back which are not stressed to any appreciable extent since there is substantially no load thereon.

The seat forming the object of my invention is designed to remedy the inconveniences aforementioned. The back and the seat proper are arranged to be displaced together under the influence of shocks and there is thus avoided the rubbing of the seat-back against the back of the occupant. The characteristic feature of the invention resides in the fact that the displacement of the arrangement of the seat takes place not only vertically but also along a pivot shaft which, if desired, may be arranged to be braked and disposed at the front of the seat in combination with springs placed at the rear. The above mentioned feature is of the greatest importance for in the case where the force $f$ acts, the reaction on the seat-back is less strong than if the arrangement could not be displaced other than along the vertical.

Figure 2:
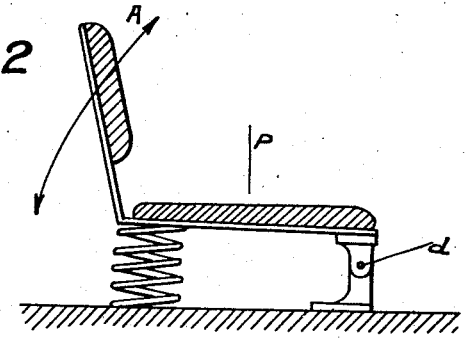
Fig. 2 is a similar view of a seat constructed according to my invention illustrating the principles upon which it is founded.

According to Fig. 2 and corresponding to the above outlined principles, a shaft $d$ which may be arranged to be braked by means of dampers permits oscillations following the arrows A, oscillations of which the amplitude may be damped by means of springs and dampers.

The advantage of such a device will be readily recognized by those skilled in the art. The shocks are no longer absorbed by the series of springs as in the case of Fig. 1 but a single system upon which reposes the total weight of the occupant P and hence almost total suppression of the reactions received by the seat back and rubbing of the back of the occupant on the seat back is accomplished.

According to Fig. 3, the frame of the seat 1 may be pivoted at the front on a shaft 2 whereas the rear may be furnished with a spring 3 whose position is regulated by means of guides 4. The back 5 is rigidly secured to the seat 1.

Figure 4:
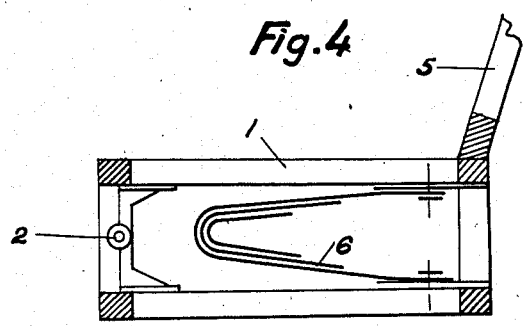

In Fig. 4 the arrangement is precisely the same with the exception that the coiled spring 3 has been replaced by a leaf spring 6 composed of a number of stepped leaves or laminations.

Figure 5:
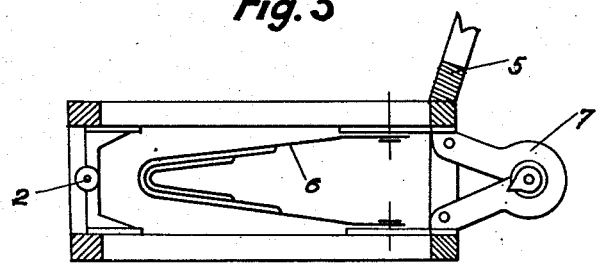

In the embodiment shown in Fig. 5, the rear of the seat is furnished with dampers 7 of the type operating either in both directions or which simply operate upon the return stroke as is well known in the art.

Fig. 6 shows a seat whose rear is furnished with Sandows 9 fixed upon the lower frame 10 and upon which are adapted to rest the crutches 8 provided upon each side of the seat.

Figure 7:
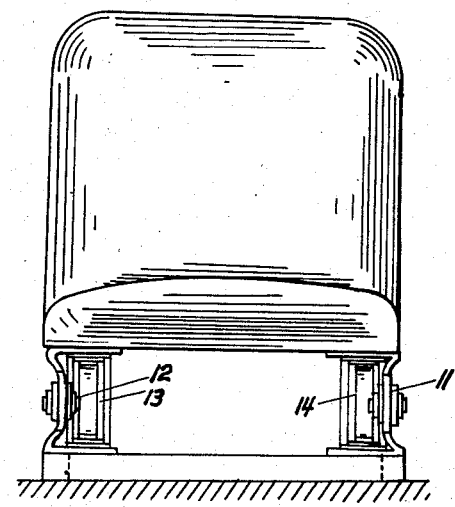
Fig. 7 is an elevational view of another embodiment of the invention as seen from the front.
Figure 8:
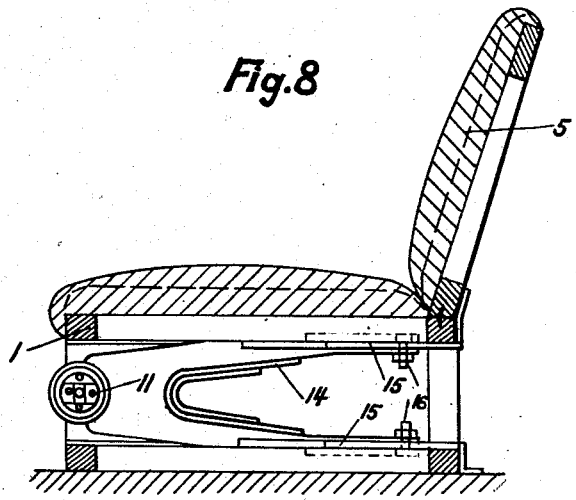
Fig. 8 is a partial transverse section of Fig. 7.

In Figs. 7 and 8 representing a further modified form of seat, the seat is mounted at the front of the frame by means of dampers 11 and 12 of any suitable type in current use such as the so-called scissor dampers whose two cut-off branches are fixed one upon the floor and the other on the frame of the seat 1 with a view to providing a braked hinge. The rear of the seat is mounted on two laminated springs 13 and 14. The said springs are fixed in two guides 15, shown in detail on a larger scale in Fig. 9, and by means of bolts 16 permitting regulation of the position of the said guides in proportion to the reaction of the springs with respect to the weight of the occupant P.

The dampers are furnished with a regulating device of any of the well known types in the art in order that their amount of braking effort may be proportioned to the weight P.

Fig. 10 shows another modified form of seat in which the back 5 can be turned over. Furthermore, the support of the seat 17 is here mounted on a hinge 18 permitting it also to be turned over when necessary.

Having thus described my invention what I claim as new and desire to secure by Letters Patent is:—

1. A vehicle seat comprising a base having a pair of slotways formed in its upper surface, a chair frame superposed above said base having a pair of slotways formed in its lower surface opposite said first mentioned slotways, a two-armed scissors damper disposed between the front end of said base and said frame, the arms of said scissors damper being secured respectively to the underside of said frame and to the upper side of said base for opposing pivotal movement of said frame on said base, a laminated U-shaped leaf spring interconnecting each pair of upper and lower slotways, a bolt in each of said slotways each having its head disposed therein and traversing the respective arm of said leaf spring, a retaining plate for each of said bolts acting as a bearing plate for said spring and a nut screwed on the extremity of each of said bolts for immobilizing said springs.

2. A vehicle seat comprising a base having a pair of slotways formed in its upper surface, a chair frame superposed above said base having a pair of slotways formed in its lower surface opposite said first mentioned slotways, a two-armed scissors damper disposed between the front end of said base and said frame, the arms of said scissors damper being secured respectively to the underside of said frame and to the upper side of said base for opposing pivotal movement of said frame on said base, a laminated U-shaped leaf spring interconnecting each pair of upper and lower slotways, a bolt in each of said slotways each having its head disposed therein and traversing the respective arm of said leaf spring, a retaining plate for each of said bolts acting as a bearing plate for said spring, a nut screwed on the extremity of each of said bolts for immobilizing said springs, a lug on said base projecting downwardly from one extremity thereof, a floor bracket, and a pivot stud on said floor bracket engaging said lug.

In testimony whereof, I have signed my name to this specification at Paris, France, this 16th day of November, 1927.

ARMAND DUFAUX.